United States Patent
Abe et al.

(10) Patent No.: US 9,469,266 B2
(45) Date of Patent: Oct. 18, 2016

(54) INFLATOR ATTACHMENT STRUCTURE AND AIRBAG APPARATUS

(71) Applicants: Kazuhiro Abe, Tokyo (JP); Kazutaka Sugimoto, Tokyo (JP); Masayuki Yamazaki, Osaka (JP)

(72) Inventors: Kazuhiro Abe, Tokyo (JP); Kazutaka Sugimoto, Tokyo (JP); Masayuki Yamazaki, Osaka (JP)

(73) Assignees: Takata Corporation, Tokyo (JP); DAICEL CORPORATION, Osaka (JP)

( * ) Notice: Subject to any disclaimer, the term of this patent is extended or adjusted under 35 U.S.C. 154(b) by 0 days.

(21) Appl. No.: 14/906,926

(22) PCT Filed: May 16, 2014

(86) PCT No.: PCT/JP2014/063037
§ 371 (c)(1),
(2) Date: Jan. 22, 2016

(87) PCT Pub. No.: WO2015/015867
PCT Pub. Date: Feb. 5, 2015

(65) Prior Publication Data
US 2016/0152204 A1 Jun. 2, 2016

(30) Foreign Application Priority Data
Jul. 31, 2013 (JP) .................. 2013-159866

(51) Int. Cl.
*B60R 21/217* (2011.01)
(52) U.S. Cl.
CPC .................. *B60R 21/217* (2013.01)
(58) Field of Classification Search
CPC .................................................. B60R 21/217
USPC ...................................................... 280/728.2
See application file for complete search history.

(56) References Cited

U.S. PATENT DOCUMENTS

| | | | |
|---|---|---|---|
| 4,913,461 A | * | 4/1990 | Cuevas ................. B60R 21/217 280/731 |
| 5,419,585 A | | 5/1995 | Breed et al. |

(Continued)

FOREIGN PATENT DOCUMENTS

| | | |
|---|---|---|
| JP | S58-054451 U | 4/1983 |
| JP | 3015716 U | 9/1995 |

(Continued)

OTHER PUBLICATIONS

International Search Report mailed on Jul. 22, 2014.

*Primary Examiner* — Ruth Ilan
(74) *Attorney, Agent, or Firm* — IPUSA, PLLC (57) ABSTRACT

An inflator attachment structure for attaching an inflator of an airbag apparatus to a retaining member of the airbag apparatus includes a first flange member including a first cylindrical part having a shape matching a substantially cylindrical projecting part provided on a lateral surface of the inflator, and including a first flange part extending outwardly in a radial direction from the first cylindrical part, the first flange member being pressed onto and engaged with the inflator from one side of the projecting part in an axial direction, and a second flange member including a second cylindrical part having a shape matching the projecting part, and including a second flange part extending outwardly in a radial direction from the second cylindrical part, the second flange member being pressed onto and engaged with the inflator from another side of the projecting part in the axial direction, wherein the first flange member includes a securing part for use in bolt securement to the retaining member, and wherein the second flange member is nipped between the first flange member and the retaining member when the first flange member is bolt-secured to the retaining member.

8 Claims, 7 Drawing Sheets

(56) References Cited

U.S. PATENT DOCUMENTS

| | | | |
|---|---|---|---|
| 5,445,406 A | 8/1995 | Jones | |
| 5,542,692 A | 8/1996 | Shaklik et al. | |
| 5,931,491 A * | 8/1999 | Bosgeiter | B60R 21/217 |
| | | | 280/728.2 |
| 6,409,209 B2 | 6/2002 | Amamori et al. | |
| 2003/0116948 A1 * | 6/2003 | Back | B60R 21/2037 |
| | | | 280/731 |
| 2005/0093279 A1 * | 5/2005 | Hauer | B60R 21/2037 |
| | | | 280/740 |
| 2005/0110246 A1 * | 5/2005 | Schneider | B60R 21/2035 |
| | | | 280/728.2 |
| 2006/0061068 A1 * | 3/2006 | Nash | B60R 21/2037 |
| | | | 280/728.2 |
| 2007/0029769 A1 * | 2/2007 | Katsuda | B60R 21/217 |
| | | | 280/737 |
| 2007/0235989 A1 * | 10/2007 | Boyd | B60R 21/217 |
| | | | 280/728.2 |
| 2008/0129019 A1 * | 6/2008 | Fangmann | B60R 21/2171 |
| | | | 280/728.2 |
| 2008/0265550 A1 * | 10/2008 | Lisseman | B60R 21/203 |
| | | | 280/728.2 |
| 2010/0295271 A1 | 11/2010 | Shimazaki et al. | |

FOREIGN PATENT DOCUMENTS

| | | |
|---|---|---|
| JP | H07-291075 | 11/1995 |
| JP | H08-040175 | 2/1996 |
| JP | 3023845 U | 4/1996 |
| JP | H10-264753 | 10/1998 |
| JP | 2001-010435 | 1/2001 |
| JP | 2001-301560 | 10/2001 |
| JP | 2004-003777 | 1/2004 |
| JP | 2009-045949 | 3/2009 |
| JP | 2011-131729 | 7/2011 |
| JP | 2013-107484 | 6/2013 |

* cited by examiner

INFLATOR ATTACHMENT STRUCTURE AND AIRBAG APPARATUS

TECHNICAL FIELD

The present invention relates to inflator attachment structures and airbag apparatuses, and particularly relates to an inflator attachment structure to generate gas for use in an airbag apparatus and to such an airbag apparatus.

BACKGROUND ART

An airbag apparatus equipped with no flanges for attachment and securement purposes is known in the art (see Patent Document 1, for example). This airbag apparatus includes a cylindrical inflator for generating gas, a retainer serving as a base member, an airbag to inflate with the gas generated by the inflator, and a bag ring for securing the perimeter of the opening of the airbag to the retainer. The bag ring includes a cylindrical part to support the end faces of the inflator in the axial direction thereof and a flange part extending in the radial direction from the cylindrical part.

In an example of the airbag apparatus described above, the flange part of the bag ring has a plurality of pins at the edge thereof bendable in the radial direction, and both the airbag and the retainer have a plurality of penetrating holes penetrating therethrough in the axial direction in one-to-one correspondence with the pins of the bag ring. In this structure, the pins of the flange part of the bag ring are inserted into the penetrating holes of the airbag and the retainer, and the tips of the pins are then bent toward the center axis, so that the bag ring, the airbag, and the retainer are secured together to form an integral whole with the inflator held therein (see FIG. 4 and FIG. 5, for example).

[Patent Document 1] Japanese Patent No. 4560881

DISCLOSURE OF INVENTION

Problem to be Solved by the Invention

The structure as described above for which a bag ring, an airbag, and a retainer are assembled and then secured together by bending the pins of the flange part of the bag ring requires process steps and apparatuses for assembling the bag ring, the airbag, and the retainer and thereafter bending the pins for the purpose of retaining, attaching, and securing the inflator. This lowers the efficiency of assembling the parts together.

Means to Solve the Problem

In consideration of the points noted above, it is an object of an embodiment of the present invention to provide an inflator attachment structure and an airbag apparatus that enable an easy attachment and securement of an inflator to a retainer. According to an embodiment of the present invention, an inflator attachment structure for attaching an inflator of an airbag apparatus to a retaining member of the airbag apparatus includes a first flange member including a first cylindrical part having a shape matching a substantially cylindrical projecting part provided on a lateral surface of the inflator, and including a first flange part extending outwardly in a radial direction from the first cylindrical part, the first flange member being pressed onto and engaged with the inflator from one side of the projecting part in an axial direction, and a second flange member including a second cylindrical part having a shape matching the projecting part, and including a second flange part extending outwardly in a radial direction from the second cylindrical part, the second flange member being pressed onto and engaged with the inflator from another side of the projecting part in the axial direction, wherein the first flange member includes a securing part for use in bolt securement to the retaining member, and wherein the second flange member is nipped between the first flange member and the retaining member when the first flange member is bolt-secured to the retaining member.

Effect of the Invention

According to an embodiment of the present invention, an inflator is easily attached and secured to a retaining member, for example.

MODE FOR CARRYING OUT THE INVENTION

In the following, embodiments of the present invention will be described by referring to the accompanying drawings.

Embodiment 1

Figure 1:
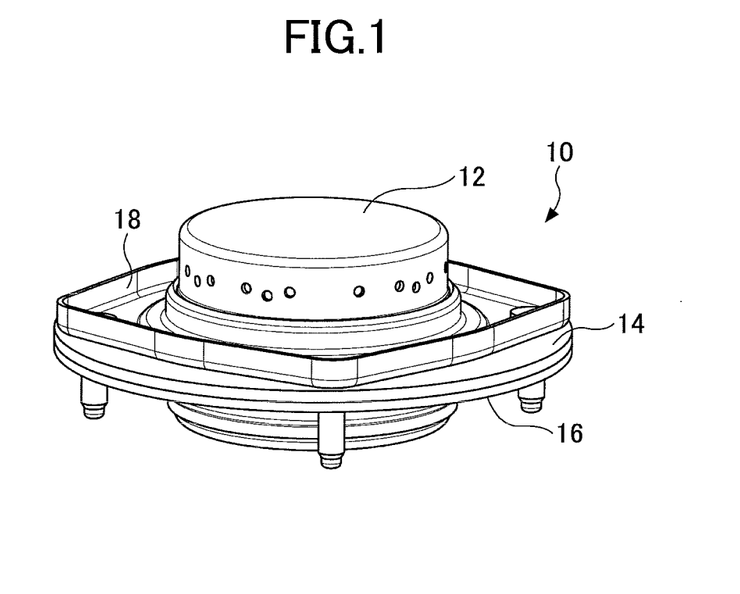
FIG. 1 is a perspective view of an airbag apparatus according to a first embodiment of the present invention.
Figure 2:
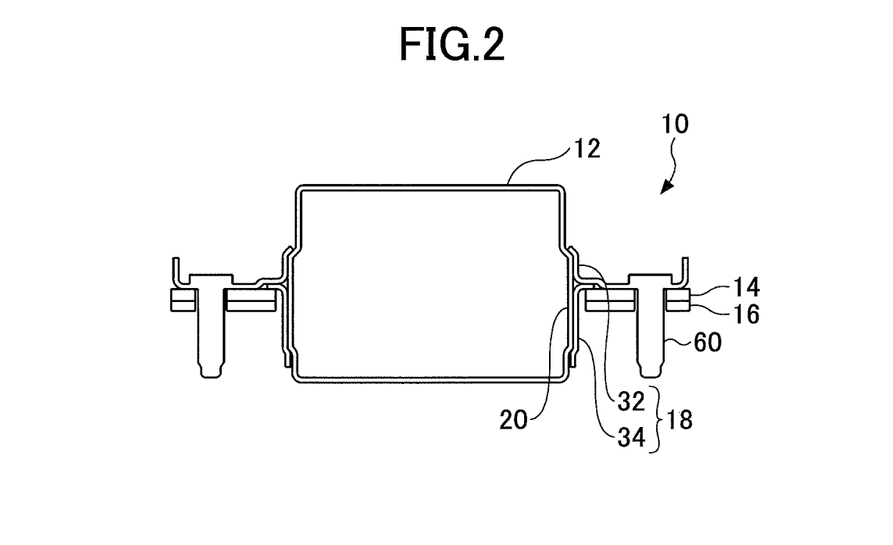
FIG. 2 is a cross-sectional view of the airbag apparatus of the present embodiment.
Figure 3:
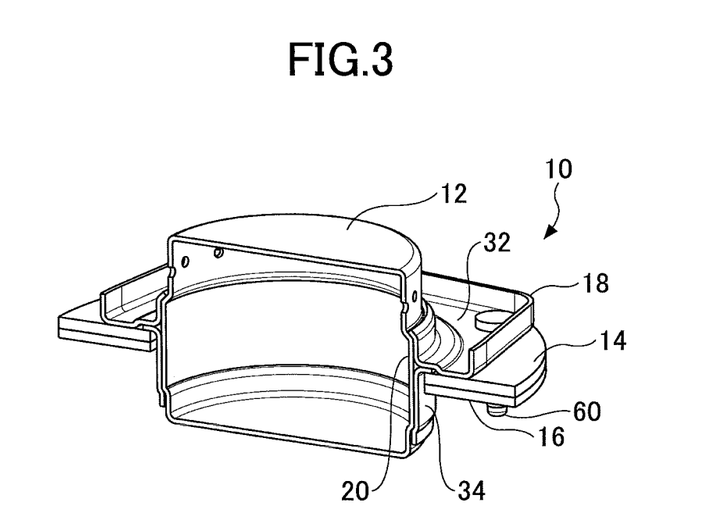
FIG. 3 is a perspective view of the airbag apparatus of the present embodiment with a part thereof removed.
Figure 4:
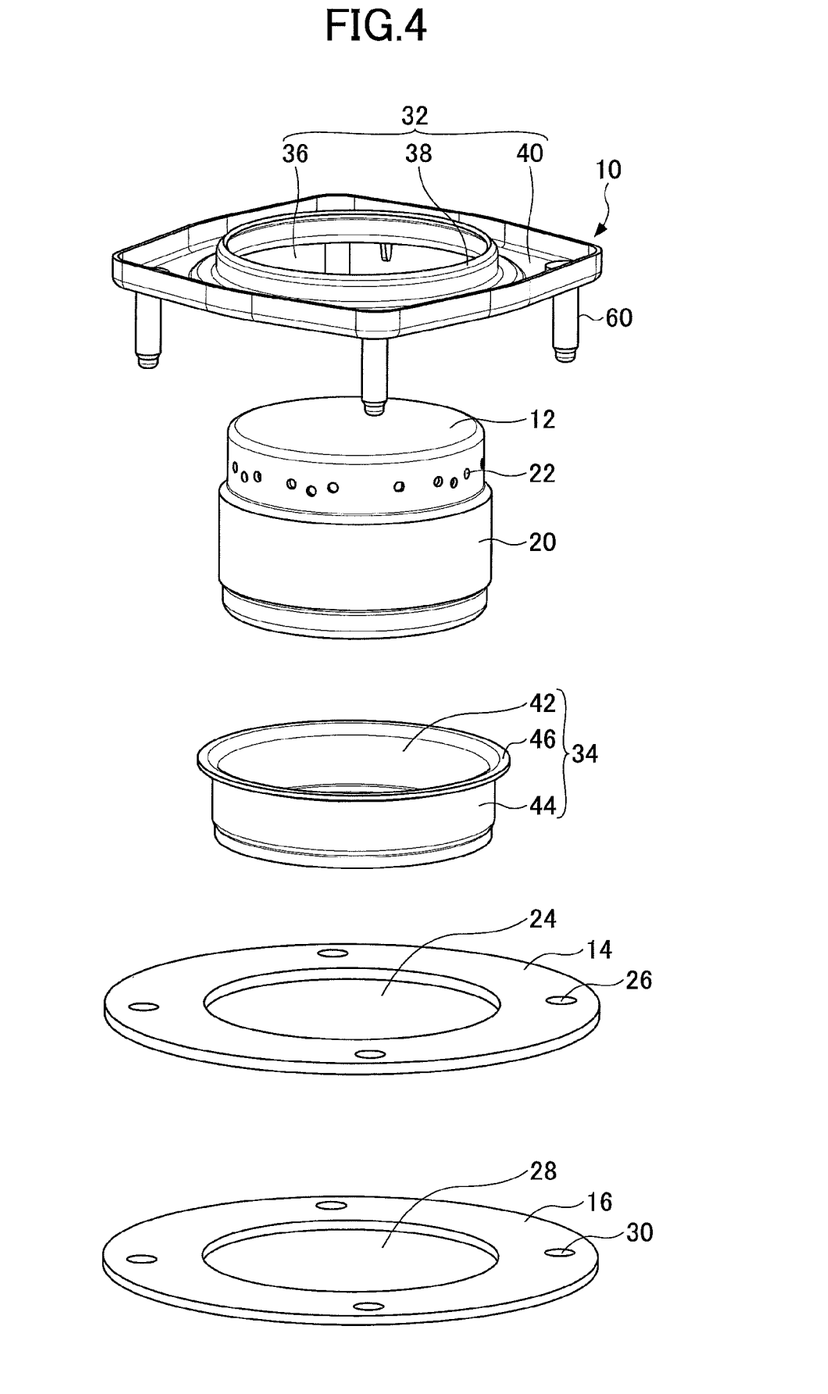
FIG. 4 is an exploded, perspective view of the airbag apparatus of the present embodiment.
Figure 5:
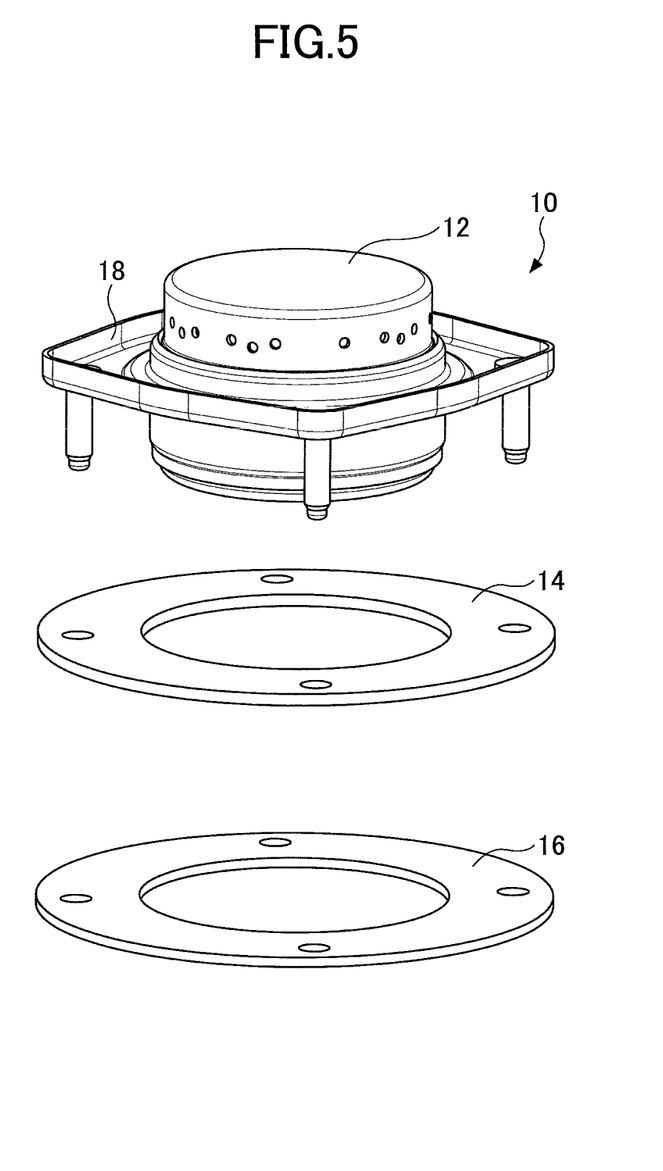
FIG. 5 is a perspective view of the airbag apparatus of the present embodiment with a part thereof disassembled for illustration.
Figure 6:
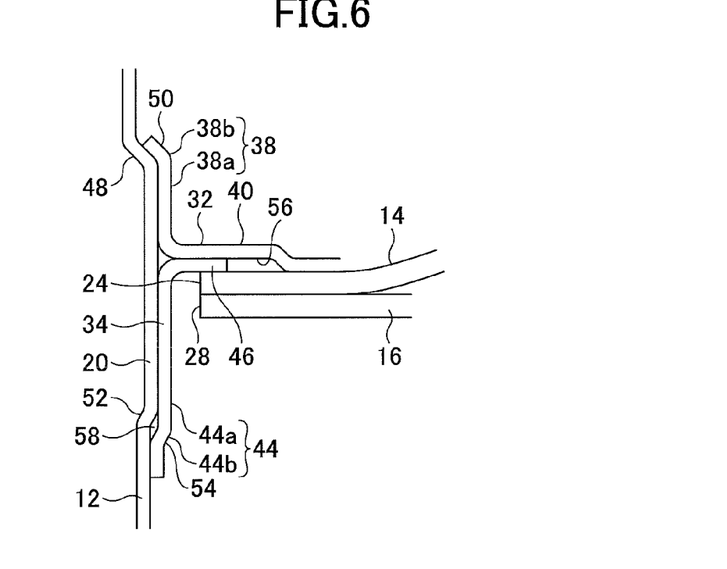
FIG. 6 is an enlarged cross-sectional view of a main part of the airbag apparatus of the present embodiment.

FIG. 1 is a perspective view of an airbag apparatus 10 according to a first embodiment of the present invention. FIG. 2 is a cross-sectional view of the airbag apparatus 10 of the present embodiment. FIG. 3 is a perspective view of the airbag apparatus 10 of the present embodiment with a part thereof removed. FIG. 4 is an exploded, perspective view of the airbag apparatus 10 of the present embodiment. FIG. 5 is a perspective view of the airbag apparatus of the present embodiment with a part thereof disassembled for illustration. FIG. 6 is an expanded cross-sectional view of a main part of the airbag apparatus 10 of the present embodiment.

In the present embodiment, the airbag apparatus 10 includes an inflator 12, an airbag 14, a retainer 16, and a flange member 18. The airbag apparatus 10 serves to inflate and expand the airbag 14 by use of gas generated by the inflator 12, the inflation and expansion of the airbag 14 then serving to protect vehicle occupants and the like. In the following, one side of the airbag apparatus 10 where the inflation and expansion of the airbag 14 occurs is referred to as an expansion side, and the side opposite to the expansion side is referred to as a non-expansion side.

The inflator 12 is a member that generates high-pressure gas. The inflator 12 has a substantially cylindrical shape, and has a projecting part 20 on the lateral surface thereof projecting outwardly in the radial direction. The inflator 12, however, has no attachment parts such as flanges, bolts, bolt holes or the like, being a so-called flangeless inflator. The projecting part 20 is formed along the entire circumference of the lateral surface at a middle point along the axial direction on the lateral surface. The projecting part 20 is formed for the purpose of attaching the flange member 18 that is necessary to secure the inflator 12 to the retainer 16.

The lateral surface of the inflator 12 has a plurality of gas ejection holes 22 that penetrate therethrough. The gas ejection holes 22 are situated further toward the expansion side than the projecting part 20 on the lateral surface of the inflator 12, and are formed in the lateral surface at predetermined angular intervals along the circumferential direction. The inflator 12 releases the generated gas through the gas ejection holes 22. Further, a connector (not shown) is attached to the end face of the inflator 12 on the non-expansion side in the axial direction for coupling with an external apparatus through wires. The inflator 12 generates gas for inflating and expanding the airbag in accordance with a gas ejection instruction supplied from the external apparatus through the connector.

The airbag 14, which is a bag-shape member having an opening 24 at a portion thereof, inflates and expands as the gas generated by the inflator 12 is supplied through the opening 24 to fill the inside. The opening 24 of the airbag 14 has a substantially circular shape such that the diameter thereof is slightly larger than the outer diameter of the inflator 12.

A plurality (e.g., four) of penetrating holes 26 having a substantially circular penetration shape are provided around the opening 24 of the airbag 14. The penetrating holes 26 are arranged at predetermined angular intervals (e.g., 90 degrees) around the axial center of the opening 24 of the airbag 14. The penetrating holes 26 serve to receive bolts, which will be described later, inserted therethrough for the purpose of securing the airbag 14. The penetrating holes 26 are formed with a diameter slightly larger than or substantially equal to the outer diameter of the bolts.

The retainer 16 is a member made of metal or resin formed into a substantially flat plate shape. The retainer 16 has an insertion hole 28 through which the inflator 12 can be inserted. The insertion hole 28 has a substantially circular shape with the diameter thereof being substantially the same as the opening 24 of the airbag 14, i.e., slightly larger than the outer diameter of the inflator 12.

A plurality (e.g., four) of penetrating holes 30 having a substantially circular penetration shape are provided around the insertion hole 28 of the retainer 16. The penetrating holes 30 are disposed at predetermined angular intervals (e.g., 90 degrees) around the axial center of the insertion hole 28 of the retainer 16, and are equal in number to the penetrating holes 26 of the airbag 14 previously described. The penetrating holes 30 serve to receive bolts, which will be described later, inserted therethrough for the purpose of securing the airbag 14 to the retainer 16. The penetrating holes 26 are formed with a diameter slightly larger than or substantially equal to the outer diameter of the bolts.

The flange member 18 is a bracket attached to the inflator 12 and required for the purpose of securing the inflator 12 to the retainer 16. The flange member 18 is a member made of resin or metal. The flange member 18 includes an upper flange member 32 situated on the expansion side of the inflator 12 and a lower flange member 34 situated on the non-expansion side of the inflator 12. The upper flange member 32 and the lower flange member 34 are pressed onto and engaged with the inflator 12.

The upper flange member 32 includes an insertion hole 36 through which the inflator 12 can be inserted, a cylindrical part 38 having a cylindrical shape formed around the insertion hole 36, and a flange part 40 having a substantially rectangular shape extending outwardly in the radial direction from the cylindrical part 38 on the non-expansion side. The lower flange member 34 includes an insertion hole 42 through which the inflator 12 can be inserted, a cylindrical part 44 having a cylindrical shape formed around the insertion hole 42, and a flange part 46 having a substantially annular shape extending outwardly in the radial direction from the cylindrical part 44 on the expansion side.

The insertion hole 36 of the upper flange member 32 has substantially the same diameter as the outer diameter of the inflator 12. The cylindrical part 38 is formed into a shape matching the shape of the inflator 12 on the expansion side. Specifically, the cylindrical part 38 is formed such that a step 50 is created to match a step 48 formed at the end of the projecting part 20 on the expansion side in the axial direction. The end of the cylindrical part 38 on the expansion side in the axial direction has a shape capable of supporting the end of the projecting part 20 of the inflator 12 situated on the expansion side in the axial direction, thereby preventing the inflator 12 from falling off from the cylindrical part 38 toward the expansion side.

The cylindrical part 38 includes a large diameter part 38a having a relatively large inner diameter corresponding to the outer diameter of the projecting part 20 of the inflator 12 and a small diameter part 38b having a relatively small inner diameter corresponding to the outer diameter of the inflator 12 at points further toward the expansion side in the axial direction than the projecting part 20. The small diameter part 38b of the cylindrical part 38 is situated further toward the expansion side in the axial direction than the large diameter part 38a, and has an inner diameter smaller than the inner diameter of the large diameter part 38a.

The insertion hole 42 of the lower flange member 34 has substantially the same diameter as the outer diameter of the inflator 12. The cylindrical part 44 is formed into a shape matching the shape of the inflator 12 on the non-expansion side. Specifically, the cylindrical part 44 is formed such that a step 54 is created to match a step 52 formed at the end of the projecting part 20 on the non-expansion side in the axial direction. The end of the cylindrical part 44 on the non-expansion side in the axial direction has a shape capable of supporting the end of the projecting part 20 of the inflator 12 situated on the non-expansion side in the axial direction, thereby preventing the inflator from falling off from the cylindrical part 38 toward the non-expansion side.

The cylindrical part 44 includes a large diameter part 44a having a relatively large inner diameter corresponding to the outer diameter of the projecting part 20 of the inflator 12 and a small diameter part 44b having a relatively small inner diameter corresponding to the outer diameter of the inflator 12 at points further toward the non-expansion side in the axial direction than the projecting part 20. The small diameter part 44b of the cylindrical part 44 is situated further toward the non-expansion side in the axial direction than the large diameter part 44a, and has an inner diameter smaller than the inner diameter of the large diameter part 44a.

The flange part 40 of the upper flange member 32 and the flange part 46 of the lower flange member 34 face each other in the axial direction. The flange part 40 of the upper flange member 32 and the flange part 46 of the lower flange member 34 are both formed to be larger than the size of the opening 24 of the airbag 14 and the size of the insertion hole 28 of the retainer 16. The flange part 40 of the upper flange member 32 has a larger shape (i.e., surface area size) than the flange part 46 of the lower flange member 34. The flange part 40 of the upper flange member 32 has an annular recess 56 matching the shape of the flange part 46 of the lower flange member 34.

The upper flange member 32 is pressed onto and engaged with the inflator 12 from the expansion side in the axial direction of the inflator 12, thereby being attached and secured to the inflator 12. The lower flange member 34 is pressed onto and engaged with the inflator 12 from the non-expansion side in the axial direction of the inflator 12, thereby being attached and secured to the inflator 12. The pressing of the upper flange member 32 and the lower flange member 34 onto the inflator 12 is continued until the flange parts 40 and 46 of these members come in contact with each other so that the flange part 46 fits into the recess 56 of the flange part 40.

The upper flange member 32, the lower flange member 34, and the projecting part 20 of the inflator 12 are configured such that a gap 58 extending in the axial direction is formed between the step 50 of the upper flange member 32 and the step 48 of the inflator 12 or between the step 54 of the lower flange member 34 and the step 52 of the inflator 12 when both of the flange members 32 and 34 are pressed onto and engaged with the inflator 12 to place the flange parts 40 and 46 thereof in contact with each other. The gap 58 is provided for the purpose of absorbing a specification difference between the parts.

The flange part 40 of the upper flange member 32 has bolts 60 formed seamlessly therewith and extending like a rod in the axial direction. A plurality of bolts 60 are disposed on the face of the flange part 40 of the upper flange member 32 facing toward the non-expansion side in the axial direction (e.g., four in the vicinity of respective corners on the face facing in the axial direction). The bolts 60 are arranged at predetermined angular intervals (e.g., 90 degrees) around the axial center of the insertion hole 36 of the upper flange member 32. The bolts 60 have an outer diameter substantially equal to or slightly smaller than the diameter of the penetrating holes 26 of the retainer 14 and the penetrating holes 30 of the airbag 14.

The airbag apparatus 10 of the present embodiment is made by assembling the inflator 12, the airbag 14, the retainer 16, and the flange member 18 with each other, which have the structures described heretofore.

Specifically, in the process of making the airbag apparatus 10, the individual members, i.e., the inflator 12, the airbag 14, the retainer 16, and the flange member 18, are prepared, and, then, the upper flange member 32 and the lower flange member 34 are pressed onto and engaged with the inflator 12 in the axial direction. The upper flange member 32 is pressed and engaged from the expansion side of the inflator 12 in the axial direction. The lower flange member 34 is pressed and engaged from the non-expansion side of the inflator 12 in the axial direction. The pressing of these flange members 32 and 34 is continued until the flange parts 40 and 46 of these members come in contact with each other so that the flange part 46 fits into the recess 56 of the flange part 40.

The cylindrical parts 38 and 44 of the upper flange member 32 and the lower flange member 34 are both formed to have the steps 50 and 54 that match the steps 48 and 52 of the projecting part 20 of the inflator 12 situated at the ends thereof in the axial direction. The end of the cylindrical part 38 on the expansion side in the axial direction and the end of the cylindrical part 44 on the non-expansion side in the axial direction have a shape capable of supporting the axial-direction ends of the projecting part 20 of the inflator 12, thereby preventing the inflator 12 from falling off from the cylindrical part 38 toward the expansion side or toward the non-expansion side. With this arrangement, the upper flange member 32 and the lower flange member 34, which constitute a pair of halves of the flange member 18 arranged in the axial direction, holds the inflator 12 so as to prevent falling off in the axial direction.

Subsequently, the inflator 12 which has been pressed into the flange members 32 and 34 is inserted, with the expansion side thereof first, into the airbag 14 through the opening 24 of the airbag 14. After this, the bolts 60 of the flange part 40 of the upper flange member 32, which have been pressed onto and engaged with the inflator 12, are inserted into the penetrating holes 26 of the airbag 14 so as to project from the other side of the penetrating holes 26. The bolts 60 of the upper flange member 32 projecting from the penetrating holes 26 of the airbag 14 are then inserted into the penetrating holes 30 of the retainer 16 to project from the other side of the penetrating holes 30, thereby assembling with the retainer 16.

After this, nuts are screwed onto the bolts 60 projecting from the penetrating holes 30 of the retainer 16. With the nuts being tightly screwed onto the bolts, the upper flange member 32 having been pressed onto and engaged with the inflator 12 is attached and secured to the retainer 16.

As was previously described, the cylindrical part 38 of the upper flange member 32 has a shape matching the shape of the inflator 12. Both the opening 24 of the airbag 14 and the insertion hole 28 of the retainer 16 have a substantially circular shape with the diameter thereof being slightly larger than the outer diameter of the inflator 12. The flange part 40 of the upper flange member 32 has a shape larger than the size of the opening 24 of the airbag 14 and the size of the insertion hole 28 of the retainer 16.

With this arrangement, the circumferential edge of the opening 24 of the airbag 14 is nipped between the flange part 40 of the upper flange member 32 and the retainer 16 upon the upper flange member 32 being secured to the retainer 16. In this state, the upper flange member 32 serves as a bag ring for supporting the circumferential edge of the opening 24 of the airbag 14 toward the retainer 16.

As was previously described, further, the cylindrical part 44 of the lower flange member 34 have a shape matching the shape of the inflator 12. The flange part 46 of the lower flange member 34 has a shape larger than the size of the opening 24 of the airbag 14 and the size of the insertion hole 28 of the retainer 16. With this arrangement, the flange part 46 of the lower flange member 34, in addition to the airbag 14 as described above, is nipped between the flange part 40 of the upper flange member 32 and the retainer 16 upon the upper flange member 32 being secured to the retainer 16. In this state, the flange part 46 of the lower flange member 34 is held in place while being retained in the recess 56 of the flange part 40 of the upper flange member 32.

With the structure of the airbag apparatus described above for which the assembly of the individual members is completed, the nuts are in threadable engagement with the bolts 60 of the upper flange member 32 that has been pressed onto and engaged with the inflator 12, thereby ensuring that the upper flange member 32 are attached and secured to the retainer 16. Also, the lower flange member 34 is attached and secured to the retainer 16 by being nipped between the upper flange member 32 and the retainer 16.

As was described above, the inflator 12 is supported by the upper flange member 32 and the lower flange member 34 so as not to fall off in the axial directions. With the structure of the airbag apparatus 10 of the present embodiment, the use of two components, i.e., the upper flange member 32 and the lower flange member 34 constituting the flange member 18 pressed onto and engaged with the inflator 12, enables the attachment and securement of the inflator 12 to the retainer 16.

Such a structure and method of attaching and securing the inflator 12 to the retainer 16 allows the flange member 18 serving as a bracket for attachment and securement to the inflator 12 to be attached to the inflator 12 by pressing. Welding is thus not used for the purpose of attaching the bracket to the inflator 12, and the plate thickness of the inflator 12 can be made thinner as a result of the nonuse of welding. This enables the streamlining of process steps and the simplification of an apparatus for making the airbag apparatus 10 as well as the weight reduction of the inflator 12.

In the structure and method of attaching and securing the inflator 12 to the retainer 16 described above, the inflator 12 is attached and secured to the retainer 16 as follows: (1) the flange member 18 serving as a bracket is divided into two halves in the axial direction; (2) the upper flange member 32 and the lower flange member 34 are pressed onto and engaged with the inflator 12 from the respective opposite sides in the axial direction; (3) the upper flange member 32 is secured to the retainer 16 by use of bolts; and (4) the lower flange member 34 is nipped between the upper flange member 32 and the retainer 16 when the upper flange member 32 is secured by the bolts, thereby securing the lower flange member 34 to the retainer 16.

In the method of (1) through (4), there is no need to use welding or the like to join the upper flange member 32 and the lower flange member 34 serving as a bracket of the inflator 12. Further, the upper flange member 32 is secured to the retainer 16 by use of bolts while nipping the flange part 46 of the lower flange member 34 between the flange part 40 of the upper flange member 32 and the retainer 16. With this, the positional relationship between the upper flange member 32 and the lower flange member 34 is fixed upon assembling the individual members. In this manner, the process of attaching and securing to the inflator 12 the flange member 18 serving as a bracket for aligning the inflator 12 with respect to the retainer 16 does not involve welding, bolt screwing, or the like. The process of attaching and securing the flange member 18 to the inflator 12 is thus easily performed.

Further, the method of (1) through (4) makes obsolete the process of bending the pins of the flange member 18 or the like, for example, other than the processes of assembling the individual members and then screwing the bolts in order to attach and secure the inflator 12 to the retainer 16. Due to this, the apparatus and labor dedicated to attaching and securing the inflator 12 to the retainer 16 are not needed, thereby avoiding a drop in the efficiency of assembling the parts. According to the present embodiment, the inflator 12 is easily attached and secured to the retainer 16.

Attaching the inflator 12 to the retainer 16 is enabled by screwing nuts onto the bolts 60 of the upper flange member 32 that project from the penetrating holes 30 of the retainer 16, and such screwing is performed from the direction of the non-expansion side defined with respect to the retainer 16. This enables the assembly of the individual members that absorbs both the assembling variation of the individual members and the specification errors created during the manufacture of the individual members, i.e., the inflator 12, the airbag 14, the retainer 16, and the flange member 18.

In the present embodiment, further, the upper flange member 32, the lower flange member 34, and the projecting part 20 of the inflator 12 are configured such that the gap 58 is formed as previously described between the step 50 of the upper flange member 32 and the step 48 of the inflator 12 or between the step 54 of the lower flange member 34 and the step 52 of the inflator 12 when both of the flange members 32 and 34 are pressed onto and engaged with the inflator 12 to place the flange parts 40 and 46 thereof in contact with each other.

With the provision of such a gap, the specification errors and parts variations created during the manufacture of the individual members, i.e., the inflator 12, the airbag 14, the retainer 16, and the flange member 18, are tolerated by the same amount as the size of the gap. This provision thus prevents the individual members from being improperly assembled, thereby ensuring that the inflator 12 is properly attached and secured to the retainer 16.

In the present embodiment, further, the upper flange member 32 has the flange part 40 extending outwardly in the radial direction, thereby serving as a bag ring for supporting the circumferential edge of the opening 24 of the airbag toward the retainer 16. The use of the upper flange member 32 providing both the bracket function for attaching the inflator 12 to the retainer 16 and the bag ring function for supporting the airbag 14 toward the retainer 16 allows the number of components and weight of the airbag apparatus 10 to be reduced. The present embodiment thus enables the weight reduction and cost reduction of the airbag apparatus 10.

In the first embodiment described above, the retainer 16 corresponds to the "retaining member" recited in the claims, the cylindrical part to the "first cylindrical part" recited in the claims, the flange part 40 to the "first flange part" recited in the claims, the upper flange member to the "first flange member" recited in the claims, the cylindrical part 44 to the "second cylindrical part" recited in the claims, the flange part 46 to the "second flange part" recited in the claims, the lower flange member 34 to the "second flange member" recited in the claims, and the bolts to the "securing part(s)" and "bolt member(s)" recited in the claims.

Embodiment 2

Figure 7:
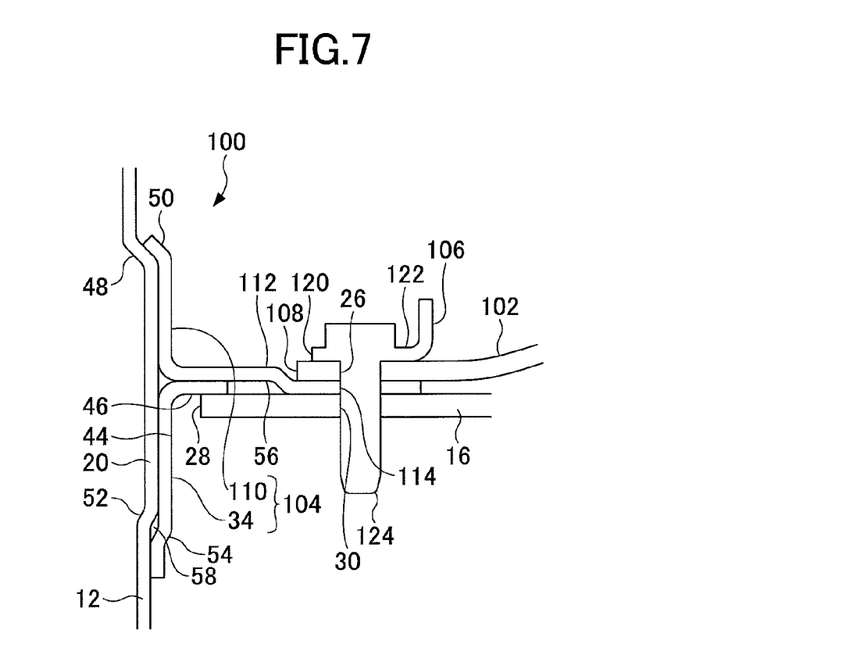
FIG. 7 is an enlarged cross-sectional view of a main part of the airbag apparatus according to a second embodiment of the present invention.

FIG. 7 is an enlarged cross-sectional view of an airbag apparatus 100 according to a second embodiment of the present invention. In FIG. 7, the same elements as those of FIG. 1 and FIG. 6 previously described are referred to by the same numerals, and a description thereof will be omitted or simplified.

In the present embodiment, the airbag apparatus 100 includes an inflator 12, an airbag 102, a retainer 16, a flange member 104, and a bag ring 106. The airbag apparatus 100 differs from the airbag apparatus 10 of the first embodiment described above in that the flange member 104 does not have the bag ring function and in that the flange member 104 and the bag ring 106 are configured as separate units. The airbag apparatus 100 serves to inflate and expand the airbag 102 by use of gas generated by the inflator 12, the inflation and expansion of the airbag 102 then serving to protect vehicle occupants and the like. In the following, one side of the airbag apparatus 100 where the inflation and expansion of the airbag 102 occurs is referred to as an expansion side, and the side opposite to the expansion side is referred to as a non-expansion side.

The airbag 102, which is a bag-shape member having an opening 108 at a portion thereof, inflates and expands as the gas generated by the inflator 12 is supplied through the opening 108 to fill the inside. The opening 108 of the airbag 102 has a substantially circular shape such that the diameter thereof is slightly larger than the outer diameter of the inflator 12. The diameter of the opening 108 may be larger than the diameter of the opening 24 of the first embodiment previously described. A plurality of penetrating holes 26 each having a substantially circular penetrating shape are formed around the opening 108.

The flange member 104 is a resin or metal bracket attached to the inflator 12 and required for the purpose of securing the inflator 12 to the retainer 16. The flange member 104 includes an upper flange member 110 situated on the expansion side of the inflator 12 and a lower flange member 34 situated on the non-expansion side of the inflator 12. The upper flange member 110 and the lower flange member 34 are pressed onto and engaged with the inflator 12.

The upper flange member 110 has the insertion hole 36, the cylindrical part 38, and a flange part 112 having a substantially annular shape extending outwardly in the radial direction from the cylindrical part 38 on the non-expansion side. The flange part 112 has no bolts 60 formed thereon unlike the flange part 40 of the upper flange member 32 of the first embodiment previously described.

The flange part 112 of the upper flange member 110 and the flange part 46 of the lower flange member 34 face each other in the axial direction. The flange part 112 of the upper flange member 110 and the flange part 46 of the lower flange member 34 are both formed to be larger than the size of the opening 108 of the airbag 102 and the size of the insertion hole 28 of the retainer 16. The flange part 112 of the upper flange member 110 has a larger shape (i.e., surface area size) than the flange part 46 of the lower flange member 34. The flange part 112 of the upper flange member 110 has an annular recess 56 matching the shape of the flange part 46 of the lower flange member 34.

A plurality (e.g., four) of penetrating holes 114 having a substantially circular penetration shape are provided in the flange part 112 of the upper flange member 110. The penetrating holes 114 are disposed at predetermined angular intervals (e.g., 90 degrees) around the axial center, and are equal in number to the penetrating holes 26 of the airbag 102 and to the penetrating holes 30 of the retainer 16 previously described. The penetrating holes 114 serve to receive bolts, which will be described later, inserted therethrough for the purpose of securing the inflator 12 and the upper flange member 110 to the retainer 16. The penetrating holes 114 are formed with a diameter slightly larger than or substantially equal to the outer diameter of the bolts.

The upper flange member 110 is pressed onto and engaged with the inflator 12 from the expansion side in the axial direction of the inflator 12, thereby being attached and secured to the inflator 12. The lower flange member 34 is pressed onto and engaged with the inflator 12 from the non-expansion side in the axial direction of the inflator 12, thereby being attached and secured to the inflator 12. The pressing of the upper flange member 110 and the lower flange member 34 onto the inflator 12 is continued until the flange parts 112 and 46 of these members come in contact with each other so that the flange part 46 fits into the recess 56 of the flange part 110.

The upper flange member 110, the lower flange member 34, and the projecting part 20 of the inflator 12 are configured such that a gap 58 extending in the axial direction is formed between the step 50 of the upper flange member 110 and the step 48 of the inflator 12 or between the step 54 of the lower flange member 34 and the step 52 of the inflator 12 when both of the flange members 110 and 34 are pressed onto and engaged with the inflator 12 to place the flange parts 112 and 46 thereof in contact with each other.

The bag ring 106 is a metal or resin member configured to attach and support the circumferential edge of the opening 108 of the airbag 102 to the face of the retainer 16 facing toward the expansion side in the axial direction. The bag ring 106 has an annular shape. The retainer 16 includes an insertion hole 120 to which the inflator 12 can be inserted, and includes an annular part 122 having an annular shape. The insertion hole 120 is formed with a diameter larger than the outer diameter of the inflator 12 and substantially equal to the diameter of the opening 108 of the airbag 102. The bag ring 106 is inserted through the opening 108 of the airbag 102 into the inside thereof and accommodated inside the airbag 102.

The annular part 122 of the bag ring 106 has bolts 124 formed seamlessly therewith. The bolts 124 extend like a rod toward the non-expansion side in the axial direction from the face of the annular part 122 of the bag ring 106 facing toward the non-expansion side in the axial direction. The bolts 124 are disposed at predetermined annular intervals (e.g., 90 degrees) around the axial center of the insertion hole 120 of the bag ring 106, and a plurality of them (e.g., four) are provided on the annular part 122. The bolts 124 have an outer diameter substantially equal to or slightly smaller than the diameter of the penetrating holes 30 of the retainer 16, the penetrating holes 26 of the airbag 102, and the penetrating holes 114 of the upper flange member 110.

The airbag apparatus 100 of the present embodiment is made by assembling the inflator 12, the airbag 102, the retainer 16, the flange member 104, and the bag ring 106 with each other, which have the structures described heretofore.

Specifically, in the process of making the airbag apparatus 100, the individual members, i.e., the inflator 12, the airbag 102, the retainer 16, the flange member 104, and the bag ring 106 are prepared, and, then, the upper flange member 110 and the lower flange member 34 are pressed onto and engaged with the inflator 12 in the axial direction. The upper flange member 110 is pressed and engaged from the expansion side of the inflator 12 in the axial direction. The lower flange member 34 is pressed and engaged from the non-expansion side of the inflator 12 in the axial direction. The pressing of these flange members 110 and 34 is continued until the flange parts 112 and 46 of these members come in contact with each other so that the flange part 46 fits into the recess 56 of the flange part 112.

The cylindrical parts 38 and 44 of the upper flange member 110 and the lower flange member 34 are both formed to have the steps 50 and 54 that match the steps 48 and 52 of the projecting part 20 of the inflator 12 situated at the ends thereof in the axial direction. The end of the cylindrical part 38 on the expansion side in the axial direction and the end of the cylindrical part 44 on the non-expansion side in the axial direction have a shape capable of supporting the axial-direction ends of the projecting part 20 of the inflator 12, thereby preventing the inflator 12 from falling off from the cylindrical part 38 toward the expansion side or toward the non-expansion side. With this arrangement, the upper flange member 110 and the lower flange member 34, which constitute a pair of halves of the flange member 104 arranged in the axial direction, holds the inflator 12 so as to prevent falling off in the axial direction.

Subsequently, the bag ring 106 is inserted into the airbag 102 through the opening 108 of the airbag 102, and, then, the bolts 124 of the bag ring 106 are inserted through the penetrating holes 26 of the airbag 102 so as to project outwardly from the penetrating holes 26. The inflator 12, which is pressed into and engaged with the flange members 110 and 34, is then inserted into the opening 108 of the airbag 102 with the expansion side of the inflator first. The bolts 124 of the bag ring 106 projecting from the penetrating holes 26 of the airbag 102 are inserted through the penetrating holes 114 of the flange part 112 of the upper flange member 110 to assemble them. Further, the retainer 16 is added to the assemblage such that the inflator is inserted into the insertion hole 28 of the retainer 16, and such that the bolts 124 of the bag ring 106 projecting from the penetrating holes 114 of the upper flange member 110 and the penetrating holes 26 of the airbag 102 are inserted into the penetrating holes 30 of the retainer 16.

After this, nuts are screwed onto the bolts 124 projecting from the penetrating holes 30 of the retainer 16. With the nuts being tightly screwed onto the bolts, the upper flange member 110 pressed onto and engaged with the inflator 12 is attached and secured to the retainer 16 through the bolts. Further, the lower flange member 34 pressed onto and engaged with the inflator 12 is attached and secured to the retainer 16 due to the fact that the flange part 46 is nipped between the retainer 16 and the flange part 112 of the upper flange member 110.

As was described above, the inflator 12 is supported by the upper flange member 110 and the lower flange member 34 so as not to fall off in the axial directions. With the structure of the airbag apparatus 100 of the present embodiment, the use of two components, i.e., the upper flange member 110 and the lower flange member 34 constituting the flange member 104 pressed onto and engaged with the inflator 12, enables the attachment and securement of the inflator 12 to the retainer 16.

Such a structure and method of attaching and securing the inflator 12 to the retainer 16 allows the flange member 104 serving as a bracket for attachment and securement to the inflator 12 to be attached to the inflator 12 by pressing. Welding is thus not used for the purpose of attaching the bracket to the inflator 12, and the plate thickness of the inflator 12 can be made thinner as a result of the nonuse of welding. This enables the streamlining of process steps and the simplification of an apparatus for making the airbag apparatus 100 as well as the weight reduction of the inflator 12.

In the structure and method of attaching and securing the inflator 12 to the retainer 16 described above, the inflator 12 is attached and secured to the retainer 16 as follows: (1) the flange member 104 serving as a bracket is divided into two halves in the axial direction; (2) the upper flange member 110 and the lower flange member 34 are pressed onto and engaged with the inflator 12 from the respective opposite sides in the axial direction; (3) the bolts 124 of the bag ring 106 placed inside the airbag 102 are made to project outwardly from the penetrating holes 26 of the airbag 102; (4) the bag ring 106 and the upper flange member 110 are secured to the retainer 16 through bolts; and (5) the lower flange member 34 is nipped between the upper flange member 110 and the retainer 16 when the upper flange member 110 is secured by the bolts, thereby securing the lower flange member 34 to the retainer 16.

In the method of (1) through (5), there is no need to use welding or the like to join the upper flange member 110 and the lower flange member 34 serving as a bracket of the inflator 12. Further, the upper flange member 110 is secured to the retainer 16 by use of bolts while nipping the flange part 46 of the lower flange member 34 between the flange part 112 of the upper flange member 110 and the retainer 16. With this, the positional relationship between the upper flange member 110 and the lower flange member 34 is fixed upon assembling the individual members. In this manner, the process of attaching and securing to the inflator 12 the flange member 104 serving as a bracket for aligning the inflator 12 with respect to the retainer 16 does not involve welding, bolt screwing, or the like. The process of attaching and securing the flange member 104 to the inflator 12 is thus easily performed.

Further, the method of (1) through (5) makes obsolete the process of bending the pins of the flange member 18 or the like, for example, other than the processes of assembling the individual members and then screwing the bolts in order to attach and secure the inflator 12 to the retainer 16. Due to this, the apparatus and labor dedicated to attaching and securing the inflator 12 to the retainer 16 are not needed, thereby avoiding a drop in the efficiency of assembling the parts. According to the present embodiment, the inflator 12 is easily attached and secured to the retainer 16.

Attaching the inflator 12 to the retainer 16 is enabled by screwing nuts onto the bolts 124 of the bag ring 106 that project from the penetrating holes 30 of the retainer 16, and such screwing is performed from the direction of the non-expansion side defined with respect to the retainer 16. The screwing of nuts onto the bolts is performed while nipping the upper flange member 110 pressed onto and engaged with the inflator 12. This enables the assembly of the individual members that absorbs both the assembling variation of the individual members and the specification errors created during the manufacture of the individual members, i.e., the inflator 12, the airbag 102, the retainer 16, the flange member 104, and the bag ring 106.

In the present embodiment, further, the upper flange member 110, the lower flange member 34, and the projecting part 20 of the inflator 12 are configured such that the gap 58 is formed as previously described between the step 50 of the upper flange member 110 and the step 48 of the inflator 12 or between the step 54 of the lower flange member 34 and the step 52 of the inflator 12 when both of the flange members 110 and 34 are pressed onto and engaged with the inflator 12 to place the flange parts 112 and 46 thereof in contact with each other.

With the provision of such a gap, the specification errors and parts variations created during the manufacture of the individual members, i.e., the inflator 12, the airbag 102, the retainer 16, the flange member 104, and the bag ring 106, are tolerated by the same amount as the size of the gap. This provision thus prevents the individual members from being improperly assembled, thereby ensuring that the inflator 12 is properly attached and secured to the retainer 16.

In the second embodiment described above, the flange part 112 corresponds to the "first flange part" recited in the claims, the upper flange member 110 to the "first flange member" recited in the claims, and the penetrating holes 114 to the "securing part(s)" and "bolt holes" recited in the claims.

Embodiment 3

Figure 8:
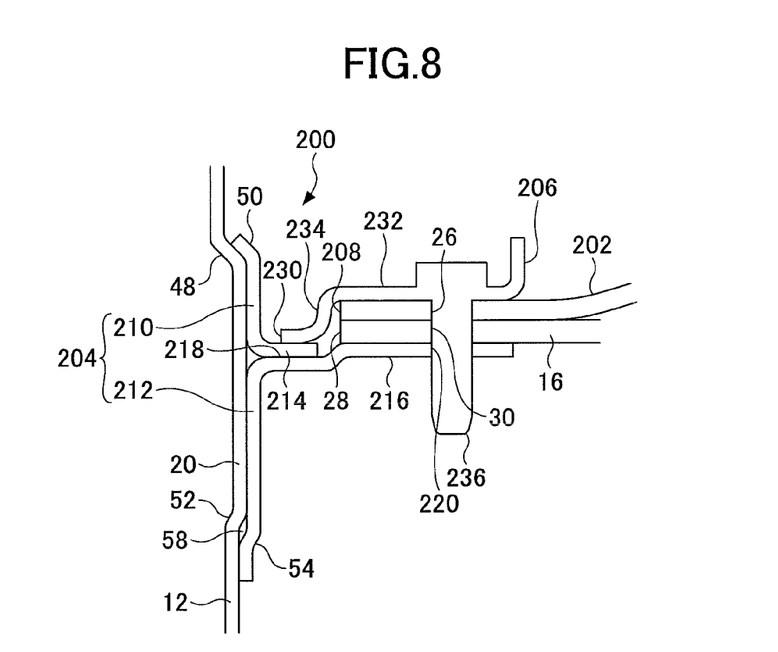
FIG. 8 is an enlarged cross-sectional view of a main part of the airbag apparatus according to a third embodiment of the present invention.

FIG. 8 is an enlarged cross-sectional view of an airbag apparatus 200 according to a third embodiment of the present invention. In FIG. 8, the same elements as those of FIG. 1 and FIG. 6 previously described are referred to by the same numerals, and a description thereof will be omitted or simplified.

In the present embodiment, the airbag apparatus 200 includes an inflator 12, an airbag 202, a retainer 16, a flange member 204, and a bag ring 206. The airbag apparatus 200 differs from the airbag apparatus 10 of the first embodiment described above in that the flange member 204 does not have the bag ring function and in that the flange member 204 and the bag ring 206 are configured as separate units. The airbag apparatus 200 serves to inflate and expand the airbag 202 by use of gas generated by the inflator 12, the inflation and expansion of the airbag 202 then serving to protect vehicle occupants and the like. In the following, one side of the airbag apparatus 200 where the inflation and expansion of the airbag 202 occurs is referred to as an expansion side, and the side opposite to the expansion side is referred to as a non-expansion side.

The airbag 202, which is a bag-shape member having an opening 208 at a portion thereof, inflates and expands as the gas generated by the inflator 12 is supplied through the opening 208 to fill the inside. The opening 208 of the airbag 202 has a substantially circular shape such that the diameter thereof is slightly larger than the outer diameter of the inflator 12. The diameter of the opening 208 may be larger than the diameter of the opening 24 of the first embodiment previously described. A plurality of penetrating holes 26 each having a substantially circular penetrating shape are formed around the opening 208.

The flange member 204 is a resin or metal bracket attached to the inflator 12 and required for the purpose of securing the inflator 12 to the retainer 16. The flange member 204 includes an upper flange member 210 situated on the expansion side of the inflator 12 and a lower flange member 212 situated on the non-expansion side of the inflator 12. The upper flange member 210 and the lower flange member 212 are pressed onto and engaged with the inflator 12.

The upper flange member 210 has the insertion hole 36, the cylindrical part 38, and a flange part 214 having a substantially annular shape extending outwardly in the radial direction from the cylindrical part 38 on the non-expansion side. The lower flange member 212 has the insertion hole 42, the cylindrical part 44, and a flange part 216 having a substantially annular shape extending outwardly in the radial direction from the cylindrical part 44 on the expansion side. The flange parts 214 and 216 have no bolts 60 formed thereon unlike the flange part 40 of the upper flange member 32 of the first embodiment previously described.

The flange part 214 of the upper flange member 210 and the flange part 216 of the lower flange member 212 face each other in the axial direction. The flange part 214 of the upper flange member 210 differs from the flange part 40 of the upper flange member 32 and the flange part 46 of the lower flange member 34 in the first embodiment previously described in that the flange part 214 is formed to have a larger shape (i.e., surface area size) than the flange part 216 of the lower flange member 212.

Specifically, the flange part 214 of the upper flange member 210 has a shape smaller than the size of the opening 208 of the airbag 202 and the size of the insertion hole 28 of the retainer 16. On the other hand, the flange part 216 of the lower flange member 212 has a shape larger than the size of the opening 208 of the airbag 202 and the size of the insertion hole 28 of the retainer 16. The flange part 216 of the lower flange member 212 has an annular recess 218 matching the shape of the flange part 214 of the upper flange member 210.

A plurality (e.g., four) of penetrating holes 220 having a substantially circular penetration shape are provided in the flange part 216 of the lower flange member 212. The penetrating holes 220 are disposed at predetermined angular intervals (e.g., 90 degrees) around the axial center, and are equal in number to the penetrating holes 26 of the airbag 202 and to the penetrating holes 30 of the retainer 16 previously described. The penetrating holes 220 serve to receive bolts, which will be described later, inserted therethrough for the purpose of securing the inflator 12 and the lower flange member 212 to the retainer 16. The penetrating holes 114 are formed with a diameter slightly larger than or substantially equal to the outer diameter of the bolts.

The upper flange member 210 is pressed onto and engaged with the inflator 12 from the expansion side in the axial direction of the inflator 12, thereby being attached and secured to the inflator 12. The lower flange member 212 is pressed onto and engaged with the inflator 12 from the non-expansion side in the axial direction of the inflator 12, thereby being attached and secured to the inflator 12. The pressing of the upper flange member 210 and the lower flange member 212 onto the inflator 12 is continued until the flange parts 214 and 216 of these members come in contact with each other so that the flange part 214 fits into the recess 218 of the flange part 216.

The upper flange member 210, the lower flange member 212, and the projecting part 20 of the inflator 12 are configured such that a gap 58 extending in the axial direction is formed between the step 50 of the upper flange member 210 and the step 48 of the inflator 12 or between the step 54 of the lower flange member 212 and the step 52 of the inflator 12 when both of the flange members 210 and 212 are pressed onto and engaged with the inflator 12 to place the flange parts 214 and 216 thereof in contact with each other.

The bag ring 206 is a metal or resin member configured to attach and support the circumferential edge of the opening 208 of the airbag 202 to the face of the retainer 16 facing toward the expansion side in the axial direction. The bag ring 206 has an annular shape. The bag ring 206 is inserted through the opening 208 of the airbag 202 into the inside thereof and accommodated inside the airbag 202. The bag ring 206 includes an insertion hole 230 into which the inflator 12 can be inserted, and includes a flange part 232 having faces facing in the axial directions.

The insertion hole 230 is formed with a diameter larger than the outer diameter of the inflator 12 and smaller than the diameter of the opening 208 of the airbag 202 and the outer diameter of the flange part 214 of the upper flange member 210. The flange part 232 has a bent part 234 and bolts 236 formed seamlessly therewith.

The bent part 234 is situated at the inner end of the flange part 232 in the radial direction. The bent part 234 extends toward the non-expansion side in the axial direction from the inner end of the flange part 232 in the radial direction, and further extends toward the inner side in the radial direction from the non-expansion-side end of in the axial direction. The bag ring 206 has both the bag ring function for supporting the circumferential edge of the opening 208 of the airbag 202 to the retainer 16 and the function to secure the upper flange member 210 toward the retainer 16 by use of the bent part 234 coming in contact with the flange part 214 of the upper flange member 210.

The bolts 236 extend like a rod toward the non-expansion side in the axial direction from the face of the flange part 232 of the bag ring 206 facing toward the non-expansion side in the axial direction. The bolts 236 are disposed at predetermined annular intervals (e.g., 90 degrees) around the axial center of the insertion hole 230 of the bag ring 206, and a plurality of them (e.g., four) are provided on the flange part 232. The bolts 236 have an outer diameter substantially equal to or slightly smaller than the diameter of the penetrating holes 30 of the retainer 16, the penetrating holes 26 of the airbag 202, and the penetrating holes 220 of the lower flange member 212.

The airbag apparatus 200 of the present embodiment is made by assembling the inflator 12, the airbag 202, the retainer 16, the flange member 204, and the bag ring 206 with each other, which have the structures described heretofore.

Specifically, in the process of making the airbag apparatus 200, the individual members, i.e., the inflator 12, the airbag 202, the retainer 16, the flange member 204, and the bag ring 206 are prepared, and, then, the upper flange member 210 and the lower flange member 212 are pressed onto and engaged with the inflator 12 in the axial direction. The upper flange member 210 is pressed and engaged from the expansion side of the inflator 12 in the axial direction. The lower flange member 212 is pressed and engaged from the non-expansion side of the inflator 12 in the axial direction. The pressing of these flange members 210 and 212 is continued until the flange parts 214 and 216 of these members come in contact with each other so that the flange part 214 fits into the recess 218 of the flange part 216.

The cylindrical parts 38 and 44 of the upper flange member 210 and the lower flange member 212 are both formed to have the steps 50 and 54 that match the steps 48 and 52 of the projecting part 20 of the inflator 12 situated at the ends thereof in the axial direction. The end of the cylindrical part 38 on the expansion side in the axial direction and the end of the cylindrical part 44 on the non-expansion side in the axial direction have a shape capable of supporting the axial-direction ends of the projecting part 20 of the inflator 12, thereby preventing the inflator 12 from falling off from the cylindrical part 38 toward the expansion side or toward the non-expansion side. With this arrangement, the upper flange member 210 and the lower flange member 212, which constitute a pair of halves of the flange member 204 arranged in the axial direction, holds the inflator 12 so as to prevent falling off in the axial direction.

Subsequently, the bag ring 206 is inserted into the airbag 202 through the opening 208 of the airbag 202, and, then, the bolts 236 of the bag ring 206 are inserted through the penetrating holes 26 of the airbag 202 so as to project outwardly from the penetrating holes 26. The retainer 16 is then added to the assemblage such that the bolts 236 of the bag ring 206 projecting from the penetrating holes 26 of the airbag 202 are inserted into the penetrating holes 30 of the retainer. Further, the inflator 12, which has been pressed into and engaged with the flange members 210 and 212, is inserted into the opening 208 of the airbag 202 and the insertion hole 230 of the bag ring 206, with the expansion side of the inflator 12 first, such that the bolts 236 of the bag ring 206 projecting from the penetrating holes 26 of the airbag 202 and the penetrating holes of the retainer 16 are inserted into the penetrating holes 220 of the flange part 216 of the lower flange member 212.

After this, nuts are screwed onto the bolts 236 projecting from the penetrating holes 220 of the lower flange member 212. With the nuts being tightly screwed onto the bolts, the lower flange member 212 pressed onto and engaged with the inflator 12 is attached and secured to the retainer through the bolts. Further, the upper flange member 210 pressed onto and engaged with the inflator 12 is attached and secured to the retainer due to the fact that the flange part 214 is nipped between the bent part 234 of the bag ring 206 and the flange part 216 of the lower flange member 212.

As was described above, the inflator 12 is supported by the upper flange member 210 and the lower flange member 212 so as not to fall off in the axial directions. With the structure of the airbag apparatus 200 of the present embodiment, the use of two components, i.e., the upper flange member 210 and the lower flange member 212 constituting the flange member 204 pressed onto and engaged with the inflator 12, enables the attachment and securement of the inflator 12 to the retainer 16.

Such a structure and method of attaching and securing the inflator 12 to the retainer 16 allows the flange member 204 serving as a bracket for attachment and securement to the inflator 12 to be attached to the inflator 12 by pressing. Welding is thus not used for the purpose of attaching the bracket to the inflator 12, and the plate thickness of the inflator 12 can be made thinner as a result of the nonuse of welding. This enables the streamlining of process steps and the simplification of an apparatus for making the airbag apparatus 200 as well as the weight reduction of the inflator 12.

In the structure and method of attaching and securing the inflator 12 to the retainer 16 described above, the inflator 12 is attached and secured to the retainer 16 as follows: (1) the flange member 204 serving as a bracket is divided into two halves in the axial direction; (2) the upper flange member 210 and the lower flange member 212 are pressed onto and engaged with the inflator from the respective opposite sides in the axial direction; (3) the bolts 236 of the bag ring 206 placed inside the airbag 202 are made to project outwardly from the penetrating holes 26 of the airbag 202; (4) the bag ring 106 and the lower flange member 212 are secured to the retainer 16 through bolts; and (5) the upper flange member 210 is nipped between the lower flange member 212 and the bag ring 206 when the lower flange member 212 is secured by the bolts, thereby securing the upper flange member 210 to the retainer 16.

In the method of (1) through (5), there is no need to use welding or the like to join the upper flange member 210 and the lower flange member 212 serving as a bracket of the inflator 12. Further, the lower flange member 212 is secured to the retainer 16 by use of bolts while nipping the flange part 214 of the upper flange member 210 between the flange part 216 of the lower flange member 212 and the bent part 234 of the bag ring 206. With this, the positional relationship between the upper flange member 210 and the lower flange member 212 is fixed upon assembling the individual members. In this manner, the process of attaching and securing to the inflator 12 the flange member 204 serving as a bracket for aligning the inflator 12 with respect to the retainer 16 does not involve welding, bolt screwing, or the like. The process of attaching and securing the flange member 204 to the inflator 12 is thus easily performed.

Further, the method of (1) through (5) makes obsolete the process of bending the pins of the flange member 18 or the like, for example, other than the processes of assembling the individual members and then screwing the bolts in order to attach and secure the inflator 12 to the retainer 16. Due to this, the apparatus and labor dedicated to attaching and securing the inflator 12 to the retainer 16 are not needed, thereby avoiding a drop in the efficiency of assembling the parts. According to the present embodiment, the inflator 12 is easily attached and secured to the retainer 16.

Attaching the inflator 12 to the retainer 16 is enabled by screwing nuts onto the bolts 236 of the bag ring 206 that project from the penetrating holes 30 of the retainer 16, and such screwing is performed from the direction of the non-expansion side defined with respect to the retainer 16. The screwing of nuts onto the bolts is performed while nipping the lower flange member 212 pressed onto and engaged with the inflator 12. This enables the assembly of the individual members that absorbs both the assembling variation of the individual members and the specification errors created during the manufacture of the individual members, i.e., the inflator 12, the airbag 202, the retainer 16, the flange member 204, and the bag ring 206.

In the present embodiment, further, the upper flange member 210, the lower flange member 212, and the projecting part 20 of the inflator 12 are configured such that the gap 58 is formed as previously described between the step 50 of the upper flange member 210 and the step 48 of the inflator 12 or between the step. 54 of the lower flange member 212 and the step 52 of the inflator 12 when both of the flange members 210 and 212 are pressed onto and engaged with the inflator 12 to place the flange parts 214 and 216 thereof in contact with each other.

With the provision of such a gap, the specification errors and parts variations created during the manufacture of the individual members, i.e., the inflator 12, the airbag 202, the retainer 16, the flange member 204, and the bag ring 206, are tolerated by the same amount as the size of the gap.

This provision thus prevents the individual members from being improperly assembled, thereby ensuring that the inflator 12 is properly attached and secured to the retainer 16.

In the third embodiment described above, the cylindrical part 44 corresponds to the "first cylindrical part" recited in the claims, the flange part 216 to the "first flange part" recited in the claims, the lower flange member 212 to the "first flange member" recited in the claims, the cylindrical part 38 to the "second cylindrical part" recited in the claims, the flange part 214 to the "second flange part" recited in the claims, the upper flange member 210 to the "second flange member" recited in the claims, and the penetrating holes 220 to the "securing part(s)" and the "bolt holes" recited in the claims.

It may be noted that in the third embodiment, the flange part 214 of the upper flange member 210 is nipped between the bent part 234 of the bag ring 206 and the flange part 216 of the lower flange member 212 in order to attach and secure to the retainer 16 the upper flange member 210 pressed onto and engaged with the inflator 12. The present invention is not limited to this. As in an airbag apparatus 300 illustrated in FIG. 9, the flange part 214 of the upper flange member 210 may be nipped between the retainer 16 and the flange part 216 of the lower flange member 212.

Figure 9:
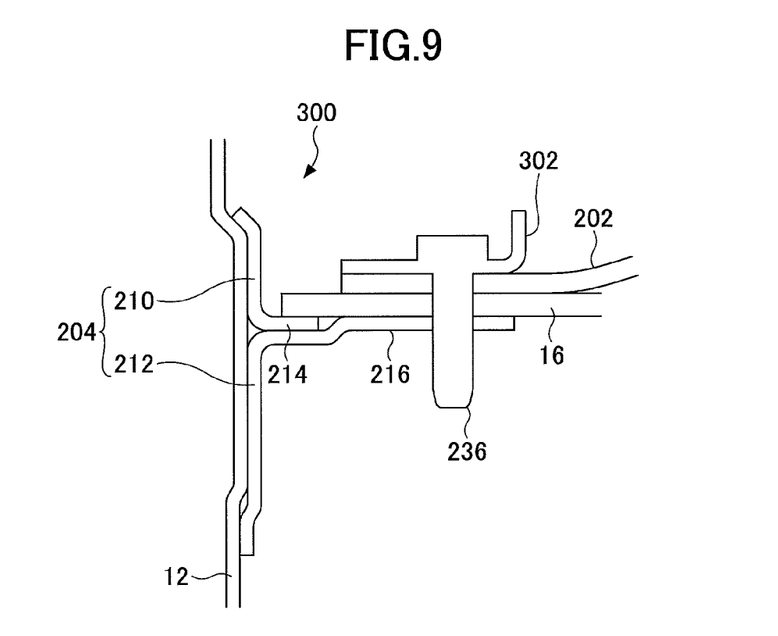
FIG. 9 is an enlarged cross-sectional view of a main part of the airbag apparatus according to a variation of the present invention.

In such a variation, a bag ring 302 is made by removing the bent part 234 from the bag ring 206 of the second embodiment described above. The diameter of the insertion hole 28 of the retainer 16 is made smaller than the diameter used in the second embodiment. Specifically, the flange part 214 of the upper flange member 210 has a shape larger than the size of the insertion hole 28 of the retainer 16. With the structure of such a variation, the upper flange member 210 is attached and secured to the retainer 16 by nipping the flange part 214 of the upper flange member 210 between the retainer 16 and the flange part 216 of the lower flange member 212, thereby attaining the same resulting effects as in the third embodiment described above.

In the first through third embodiments described above, one of the pair of flange members has a smaller flange part than the other flange part, and such a smaller flange part 46 or 216 of the flange members 34 or 210 secured to the retainer 16 by being nipped has no projecting parts projecting in the axial direction.

Figure 10:
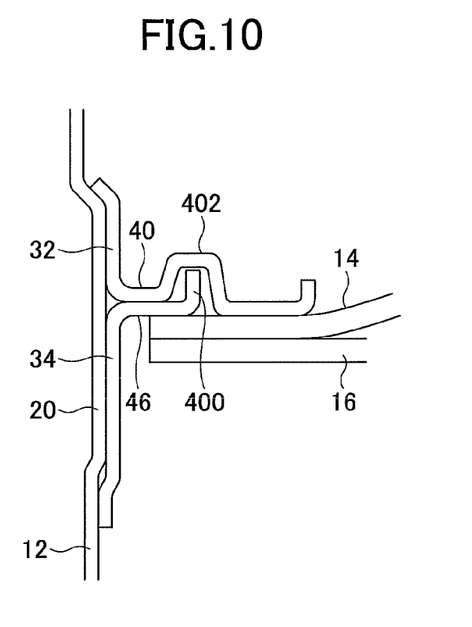
FIG. 10 is an enlarged cross-sectional view of a main part of the airbag apparatus according to a variation of the present invention.

The present invention is not limited to this. As illustrated in FIG. 10, such a flange part 46 or 214 may have a projecting part 400 projecting in the axial direction toward the expansion side for the purpose of positional alignment. This projecting part 400 may be formed on the flange part 46 or 216 along the entire circumference thereof around the axial center, or may be formed only partially around the axial center. In the case of the projecting part 400 being formed on the flange part 46 or 214 of the flange members 34 or 210, the flange part 40, 112, or 216 of the other flange member 32, 110, or 212 has a recess 402 corresponding to the projecting part 400.

In such a variation, the projecting part 400 of the flange part 46 or 214 of the flange members 34 or 210 is engaged with the recess 402 of the flange part 40, 112, or 216 of the flange member 32, 110, or 212, thereby preventing the flange members 34 or 210 from loosely moving relative to the retainer 16 and the flange member 32, 110, or 212. Positional alignment can also be made with respect to the flange members 34 or 210.

Figure 11:
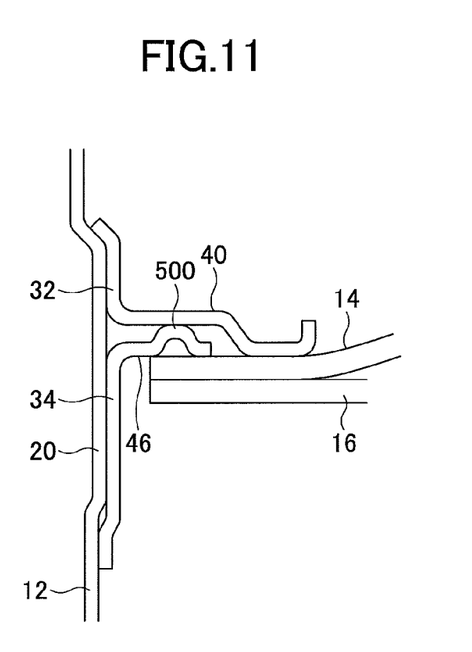
FIG. 11 is an enlarged cross-sectional view of a main part of the airbag apparatus according to a variation of the present invention.

Further, as illustrated in FIG. 11, a projecting part 500 projecting toward the expansion side in the axial direction may be formed on the flange part 46 or 214 described above. This projecting part 500 is formed only partially around the axial center on the flange part 46 or 214, and suffices as long as it has a pin shape. In such a variation, the projecting part 500 is placed in point or line contact with the face of the flange part 40, 112, or 216 of the flange member 32, 110, or 212 facing toward the non-expansion side in the axial direction after the assembly of the members is completed. Such an arrangement prevents the generation of noise and the breakage of the members caused by relative movements between the flange member 34 or 210 and the flange member 32, 110, or 212.

In the first through third embodiments described above, further, the bolts 60, 124, and 236 are formed seamlessly with the upper flange member 32, the bag ring 106, and the bag ring 206, respectively. The present invention is not limited to this. The bolts may be formed separately from the upper flange member 32 or the bag ring 106 or 206.

Although the present invention has heretofore been described with reference to the embodiments, the present invention is not limited to these embodiments, but various variations and modifications may be made without departing from the scope of the present invention.

This international application claims foreign priority to Japanese Patent Application No. 2013-159866 filed on Jul. 31, 2013. The entire contents of Japanese Patent Application No. 2013-159866 are incorporated herein by reference.

DESCRIPTION OF REFERENCE SYMBOLS 10, 100, 200 airbag apparatus
12 inflator 14, 102, 202 airbag
16 retainer
18, 104, 204 flange member
20 projecting part
32, 110, 210 upper flange member
34, 212 lower flange member
38, 44 cylindrical part
40, 46, 112, 214, 216 flange part
58 gap
60, 124, 236 bolt
106, 206 bag ring
114, 220 penetrating holes

The invention claimed is:

1. An inflator attachment structure for attaching an inflator of an airbag apparatus to a retaining member of the airbag apparatus, comprising:
    a first flange member including a first cylindrical part having a shape matching a substantially cylindrical projecting part provided on a lateral surface of the inflator, and including a first flange part extending outwardly in a radial direction from the first cylindrical part, the first flange member being pressed onto and engaged with the inflator from one side of the projecting part in an axial direction; and
    a second flange member including a second cylindrical part having a shape matching the projecting part, and including a second flange part extending outwardly in a radial direction from the second cylindrical part, the second flange member being pressed onto and engaged with the inflator from another side of the projecting part in the axial direction,
    wherein the first flange member includes a securing part for use in bolt securement to the retaining member, and
    wherein the second flange member is nipped between the first flange member and the retaining member when the first flange member is bolt-secured to the retaining member.

2. The inflator attachment structure as claimed in claim 1, wherein the securing part is a bolt member seamlessly formed with a flange face of the first flange member.

3. The inflator attachment structure as claimed in claim 1, wherein the securing part is a bolt hole formed through a flange face of the first flange member, and
    the first flange member is bolt-secured to the retaining member through a bolt inserted into the bolt hole.

4. The inflator attachment structure as claimed in claim 1, wherein the first flange member serves as a bag ring that supports, to the retaining member, an airbag inflating with gas generated by the inflator.

5. The inflator attachment structure as claimed in claim 1, wherein the retaining member is a plate-shape retainer having an insertion hole into which the inflator is able to be inserted.

6. The inflator attachment structure as claimed in claim 1, wherein the retaining member includes a plate-shape retainer having an insertion hole into which the inflator is able to be inserted, and includes a bag ring for securing to the retainer an airbag inflating with gas generated by the inflator, and
    wherein the first flange member, together with the bag ring, is bolt-secured to the retainer through the securing part, and
    the second flange member is nipped between the first flange member and the bag ring when the first flange member is bolt-secured to the retainer.

7. The inflator attachment structure as claimed in claim 1, wherein the first and second flange members and the projecting part are configured such that a gap extending in the axial direction is created between an end of the projecting part in the axial direction and an end of at least one of the first and second flange members in the axial direction when the first and second flange members are pressed onto and engaged with the inflator.

8. An airbag apparatus having the inflator attachment structure of claim 1.

* * * * *